United States Patent [19]
Mukaiyama et al.

[11] 3,869,480
[45] Mar. 4, 1975

[54] PROCESS FOR PREPARING SPIRO COMPOUNDS

[75] Inventors: Teruaki Mukaiyama, Tokyo; Moriaki Higo; Harumi Katsuyama, both of Saitama, all of Japan

[73] Assignee: Fuji Photo Film Co., Ltd., Kanagawa, Japan

[22] Filed: Mar. 16, 1972

[21] Appl. No.: 235,320

[30] Foreign Application Priority Data
Mar. 17, 1971  Japan.............................. 46-14842

[52] U.S. Cl............. 260/347.8, 260/333, 260/345.9
[51] Int. Cl............................................. C07d 5/04
[58] Field of Search.............. 260/345.9, 333, 347.8

[56] References Cited
OTHER PUBLICATIONS
Mukayaima et. al., Tetrahedron Letters Sept. 1971, No. 40, pp 3697-3700
Takei et. al., Bulletin of the Japanese Chemical Society vol. 41, No. 7, July 1968, p. 1738

*Primary Examiner*—Henry R. Jiles
*Assistant Examiner*—Bernard I. Dentz
*Attorney, Agent, or Firm*—Sugrue, Rothwell, Mion, Zinn & Macpeak

[57] ABSTRACT

A spiro compound having the general formula

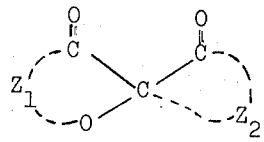

wherein $Z_1$ is a bonding group which forms a lactone and is selected from the group consisting of $-(CH_2)_n-$, which $n$ is an integer of from 2 to 4;

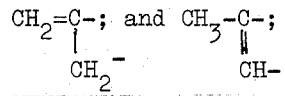

wherein $Z_2$ is a bonding group $-(CH_2)_m-$, in which $m$ is an integer of from 3 to 6, forming an alicyclic paraffin ring; and wherein $R_1$ and $R_2$ are each an alkyl group having from 1 to 3 carbon atoms. These compounds are useful in photography.

10 Claims, No Drawings

PROCESS FOR PREPARING SPIRO COMPOUNDS

BACKGROUND OF THE INVENTION

The present invention relates to a process for preparing new spiro compounds.

SUMMARY OF THE INVENTION

In more detail, the present invention relates to a process for preparing new spiro compounds of the general formula (III) comprising reacting a stable cyclic sulfonium ylide of the general formula (I), such as ketene dimer, β-propiolactone and γ-butyrolactone, under mild temperature conditions by a new reaction in accordance with the following reaction scheme (1) in which a methylene carbon atom of the cyclic sulfonium ylide is inserted between the carbonyl carbon atom and the oxygen atom of the lactone while splitting off a sulfide. Reaction Scheme (1)

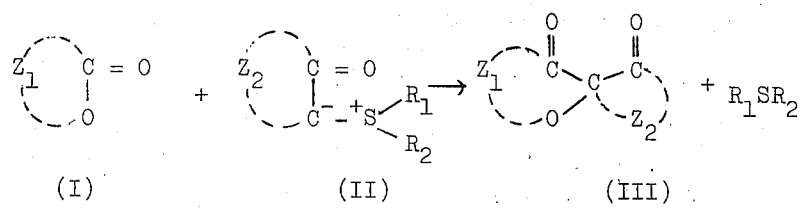 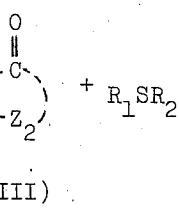

(I)    (II)    (III)

wherein $Z_1$ is a bonding group which forms a lactone, such as $-(CH_2)_n-$ ($n = 2, 3$ or $4$),

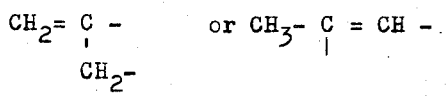

$Z_2$ is a bonding group which forms an alicyclic paraffin, such as $-(CH_2)_m-$ ($m = 3, 4, 5$ or $6$) $R_1$ and $R_2$ are each an alkyl group having from 1 to 3 carbon atoms.

DETAILED DESCRIPTION OF THE INVENTION

As the cyclic sulfonium ylide, dimethylsulfonium-2-oxo-cyclopentylide, diethylsulfonium-2-oxo-cyclohexylide, dimethylsulfonium-2-oxo-cyclohexylide, dimethylsulfonium-2-oxo-heptylide and dimethylsulfonium-2-oxo-cyclooctylide and the like, are suitable.

The reaction can be conducted both in the presence or absence of a solvent.

As the reaction solvent used in the present invention, many organic solvents can be used. For example, aliphatic hydrocarbon solvents such as hexane and octane; aromatic solvents such as benzene, toluene, and xylene; ether solvents such as dialkyl ethers such as diethyl ether and methyl ethyl ether, cyclic ethers such as tetrahydrofuran and dioxane, and cellosolve ethers; alcohols such as methanol and ethanol; and halogenated paraffins such as methylene chloride, chloroform and carbon tetrachloride, are suitable. The preparation of the spiro compounds of the present invention can be carried out at a reaction temperature ranging from about $-50°C$ to about $100°C$. But about room temperature (about $20°$ to $30°C$) is generally preferable.

The products prepared by the process of the present invention can be used as an additive for silver salt photography, an image stabilizer for non-silver salt photography and as intermediate products for producing non-silver salt photographic sensitive materials.

The spiro compounds of the present invention are new compounds which have not been described previously in the literature. The reaction of the present invention in which a methylene carbon atom of the sulfonium ylide is inserted between the carbonyl carbon atom and the oxygen atom of the lactone is a new type of reaction which is very interesting in synthetic organic chemistry. There is no case excepting using carbene in which a reaction for inserting methylene carbon atoms into many kinds of bonds is observed often.

The structure of the spiro compounds prepared by the present invention was determined using many types of instrumental analyses such as elementary analysis, infrared absorption spectrum, mass spectrum and nuclear magnetic resonance spectrum analyses etc.

In the following, the above-mentioned point is described. In an example of a spiro compound in which $Z_1$ in the formula is

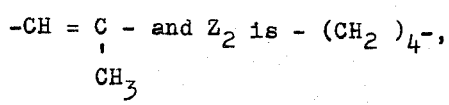

and $Z_2$ is $-(CH_2)_4-$, the structure was determined as follows.

This compound was a white crystal having a melting point of $84.5°-86.0°C$. By elementary analysis, a carbon of 66.66 percent and a hydrogen of 6.70 percent were determined which coincided with the calculated value for $C_{10}H_{12}O_3$, that is, a carbon of 66.65 percent and a hydrogen of 6.71 percent. The molecule ion peak of the mass spectrum was 180. Thus, the composition and the molecular formula of the compound were confirmed.

Using the infrared absorption spectrum, strong absorptions at $1724 cm^{-1}$ due to the stretch vibration of the carbonyl group, $1690 cm^{-1}$ due to the stretch vibration of the $\alpha,\beta$-unsaturated ketone and $1610 cm^{-1}$ due to the stretch vibration of the carbon to carbon double bond were observed. Using nuclear magnetic resonance spectrum, absorptions at 1.5 to 3.1 ppm belonging to the methylene group corresponding to 8H, 2.29ppm (3H) belonging to the methyl group and 5.27ppm (1H) belonging to the hydrogen atoms bonded to the carbon-carbon double bond were observed. Further, in the ultraviolet absorption spectrum, an absorption maximum at $266m\mu$ ($\epsilon$ 9500, methanol) was observed which affirmed the presence of the $\alpha,\beta$-unsaturated ketone.

As the result of the above-described determinations, it became clear that the structure of this compound was 2,3-dihydro-5-methyl-3-oxo-spiro(furan-2,2'-cyclohexanone).

In the following, the reaction of the present invention is described in greater detail. The sulfide which is a divalent sulfur compound reacts with an alkyl halide to form a sulfonium salt which is a trivalent sulfonium compound. This trivalent sulfonium compound releases a hydrogen halogenide by action of the base forming a carbanion. This carbanion forms a p$\pi$—d$\pi$ bond by donating an electron to 3d orbit of the sulfur atom which has no electron, by which it is stabilized as the so-called sulfur ylide. Ingold discovered the presence of dimethylsulfonium fluorenide in 1930 (see "Journal of the Chemical Society" 133, 713 (1930)). Recently, new active sulfur ylides have been synthesized and separated as stable crystals by Corey (see "Journal of the American Chemical Society" 84, 867 (1962)) Franzen (see Chemische Berichte 96, 1881 (1963)) and Nozaki (see Tetrahedron Letters, 251 (1965)). Since then, numerous studies have been done and application to synthetic organic reactions has been reported widely (see A. W. Johnson Ylid Chemistry (1966), Academic Press, New York).

The present invention has resulted from studies, carried out over several years. Namely, the reaction of the present invention has been found by considering the fact that cyclic sulfonium ylides react in good yields with acetylene compounds under very mild conditions to form ring expanded sulfonium products in which a two carbon atoms increase in the ring occurs.

In the following, the reaction of the present invention will be explained in greater detail by reference to the following examples, which should be considered as illustrative rather than limiting in any manner.

SYNTHESIS EXAMPLE 1

Synthesis of cyclic sulfonium ylide a. Synthesis of sulfonium salt from a halogenoketone:

A sulfonium salt was produced using the method of Pettitt (as described Journal of Organic Chemistry 29, 2702 (1964)) in which a sulfonium salt was obtained by reacting a 2-halogeno alicyclic ketone synthesized conventionally (for example, 2-bromocyclopentanone, 2-bromocyclohexanone, 2-bromocycloheptanone and 2-bromocyclooctanone) with dimethylsulfide in the presence of a silver salt of 2,4,6-trinitrobenzene sulfonic acid or silver borofluoride, or a method of reaction with the sodium salt of methylmercaptan and separating the sulfonium salt using dimethyl sulfate.

b. Synthesis of sulfonium ylide from the sulfonium salt:

A saturated aqueous solution of potassium carbonate in which a 50 percent aqueous solution of sodium hydroxide was suspended was added to a chloroform solution of the sulfonium salt while cooling with ice. After stirring for 30 minutes, the chloroform layer was separated and dried using potassium carbonate. Then, it was concentrated to produce a sulfonium ylide.

Structure of the resulting sulfonium ylide:

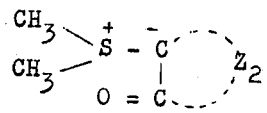

Yield, the melting point and the infrared absorption spectrum of the resulting sulfonium ylide are shown in Table 1.

Table 1

| $Z_2$ Substituent | Yield (%) | Melting Point (°C) | Infrared Absorption Spectrum ($\gamma$ C=O), (cm$^{-1}$) |
|---|---|---|---|
| $+CH_2+_3$ | * | — | — |
| $+CH_2+_4$ | 70 | 107 | 1535 |
| $+CH_2+_5$ | 26 | 106 | 1530 |
| $+CH_2+_6$ | 6 | 82 | 1516 |

(*: Only stable in solution, and impossible to separate at room temperature)

SYNTHESIS EXAMPLE 2

Synthesis of 2,3-dihydro-5-methyl-3-oxo-spiro (furan-2,2'-cyclohexanone)

To a suspension of dimethylsulfonium-2-oxo-cyclohexylide (0.79g, 5.0 m mol) in benzene, a benzene solution (8 ml) of ketene dimer (0.42g, 50 m mol) was added at room temperature. Since the reaction proceeded exothermically the crystals of dimethylsulfonium-2-oxo-cyclohexylide disappeared and a transparent light yellow solution was obtained. After stirring at room temperature for 10 hours, the mixture was heated to 65°C for an hour in order to complete the reaction. After removing the benzene by distillation under a reduced pressure, 0.85g of white crystals of 2,3-dihydro-5-methyl-3-oxo-spiro (furan-2,2'-cyclohexanone) was obtained, the yield of which was 94 percent.

In this compound, $Z_1$ was $CH_3$- C = CH - and $Z_2$ was $—CH_2$ )$_4$. The structure was the same as that in Synthesis Example 1.

SYNTHESIS EXAMPLE 3

Synthesis of 2,3-dihydro-5-methyl-3-oxo-spiro (furan-2,2'-cycloheptanone)

2,3-Dihydro-5-methyl-3-oxo-spiro(furan-2,2'-cycloheptanone) was produced as white crystals in a yield of 97 percent by reacting dimethylsulfonium-2-oxo-cycloheptylide with ketene dimer in the same manner as described in Synthesis Example 2. The results obtained in the analyses are shown in Table 2.

Table 2

| | |
|---|---|
| Melting Point (°C) | 105 – 106 |
| Elementary Analysis (%) | C: 67.76,  H: 7.17 |
| Calculated Value as $C_{11}H_{14}O_3$ (%) | C: 68.02,  H: 7.27 |
| Infrared Absorption Spectrum (cm$^{-1}$) | 1727 ($\gamma$ C = O), 1682 ($\gamma$ C = C – C = O), 1602 ($\gamma$ C = C) |
| Nuclear Magnetic Resonance Spectrum (ppm) | 1.2 – 2.6 (8H multiple lines) 2.32 (3H, S), 2.98 (2H, d), 5.31 (1H, S) |
| Ultraviolet Absorption Spectrum (m$\mu$) | $\lambda$ max 266 ($\epsilon$ = 9100, methanol) |

In this compound, $Z_1$ is $CH_3—C$ $$= CH \text{ and } Z_2$$

is $+CH_2+_5$.

SYNTHESIS EXAMPLE 4

Synthesis of 3-oxo-spiro(tetrahydropyran-2,2'-cyclohexanone)

3-Oxo-spiro(tetrahydropyran-2,2'-cyclohexanone) was produced as white crystals in a yield of 50 percent by reacting dimethylsulfonium-2-oxo-cyclohexylide with γ-butylolactone in the same manner as described in Synthesis Example 2 and removing the benzene from the resulting oily substance using a silica gel column (Wakogel C 200, made by Wako Junyaku Co.). The result of the analyses are shown in Table 3.

Table 3

| | |
|---|---|
| Melting Point (°C) | 50 |

Table 3-Continued

| | |
|---|---|
| Elementary Analysis (%) | C: 65.90, H: 7.72 |
| Calculated Value as $C_{10}H_{14}O_3$ (%) | C: 65.91, H: 7.74 |
| Infrared Absorption Spectrum (cm$^{-1}$) | 1727 (γ C = O) <br> 1720 (γ C = O) |
| Nuclear Magnetic Resonance Spectrum (ppm) | Multiple lines at 1.2 – 2.8 |
| Ultraviolet Absorption Spectrum (mμ) | 270 (ε = 30) |

While the invention has been described in term of various examples it will be apparent that changes and modifications can be made without departing from the spirit and scope of the invention.

What is claimed is:

1. A spiro compound having the formula

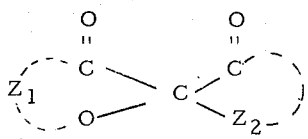

wherein $Z_1$ is selected from the group consisting of $+CH_2+_n$, in which $n$ is an integer of from 2 to 4;

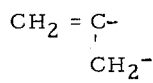

with the $CH_2$ — end being attached to a keto carbon atom of the spiro compound; and

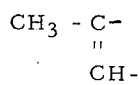

with the CH— end being attached to a keto carbon atom of the spiro compound; wherein $Z_2$ is a bonding group $+CH_2+_m$, in which m is an integer of from 3 to 6, forming an alicyclic paraffin ring.

2. A process for preparing a spiro compound of the formula (III)

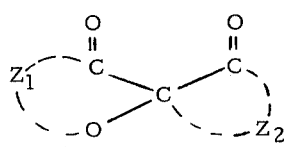

which comprises reacting a cyclic sulfonium ylide of the formula (I)

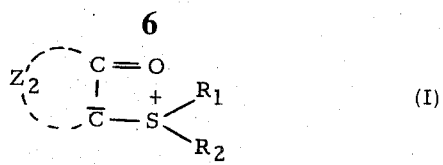

with a lactone of the formula (II)

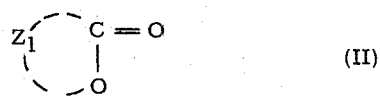

wherein $Z_1$ is selected from the group consisting of $+CH_2+_n$ in which $n$ is an integer of from 2 to 4;

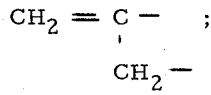

with the $CH_2$— end being attached to a keto carbon atom of the spiro compound; and

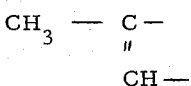

with the CH— end being attached to a keto carbon atom of the spiro compound; wherein $Z_2$ is a bonding group $+CH_2+_m$, in which $m$ is an an integer of from 3 to 6, forming an alicyclic paraffin ring; and wherein $R_1$ and $R_2$ are each an alkyl group having from 1 to 3 carbon atoms.

3. The process of claim 2, wherein said cyclic sulfonium ylide is selected from the group consisting of dimethyl-sulfonium-2-oxo-cyclopentylide, diethyl-sulfonium-2-oxo-cyclohexylide, dimethylsulfonium-2-oxo-cyclohexylide, dimethyl-sulfonium-2-oxo-cycloheptylide and dimethylsulfonium-2-oxo-cyclooctylide.

4. The process of claim 2, wherein said lactone is selected from the group consisting of ketene dimer, β-propiolactone and γ-butyrolactone.

5. The process of claim 2, wherein said process is conducted in a solvent.

6. The process of claim 5, wherein said solvent is selected from the group consisting of hydrocarbons, ethers, alcohols and halogenated paraffins.

7. The process of claim 2, wherein said process is conducted at a temperature of from about −50°C to about 100°C.

8. The process of claim 7, wherein said process is conducted at a temperature of from about 20° to about 30°C.

9. The spiro compound of claim 1, wherein said spiro compound is 2,3-dihydro-5-methyl-3-oxo-spiro (furan-2,2'-cyclohexanone).

10. The process of claim 2, wherein said spiro compound of the general formula (III) is 3,3-dihydro-5-methyl-3-oxo-spiro (furan-2,2'-cyclohexanone), wherein said cyclic sulfonium ylide of the general formula (I) is dimethyl-sulfonium-2-oxo-cyclohexylide, wherein the lactone of the general formula (II) is ketene dimer.

* * * * *